(12) United States Patent
Byers

(10) Patent No.: US 7,423,852 B2
(45) Date of Patent: Sep. 9, 2008

(54) APPARATUS FOR PROVIDING HOLDOVER POWER

(75) Inventor: Charles C. Byers, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 307 days.

(21) Appl. No.: 11/137,524

(22) Filed: May 25, 2005

(65) Prior Publication Data

US 2006/0268483 A1    Nov. 30, 2006

(51) Int. Cl.
*H02H 3/22* (2006.01)
(52) U.S. Cl. .......................................... 361/18; 361/111

(58) Field of Classification Search .................. 361/18, 361/91.1, 111; 363/21.01, 21.1, 89, 142, 363/65
See application file for complete search history.

(56) References Cited

U.S. PATENT DOCUMENTS

| 5,734,259 | A | * | 3/1998 | Sisson et al. ................ 323/282 |
| 5,903,449 | A | * | 5/1999 | Garrigan et al. .............. 363/41 |

* cited by examiner

*Primary Examiner*—Michael Sherry
*Assistant Examiner*—Danny Nguyen

(57) ABSTRACT

Apparatus defining a circuit module for receiving an operating voltage on an input and for generating a voltage of a lower magnitude that is applied to an intermediate bus. A holdover energy source, such as an ultra capacitor or the like, of the circuit module has a voltage lower than said input voltage and the voltage of said intermediate bus. The holdover energy source is connected under control of a voltage supervisor to a boost converter in response to the receipt of a transient on the input. The boost converter is responsive to the connection to generate a boost voltage that maintains a constant voltage on the intermediate bus.

16 Claims, 3 Drawing Sheets

APPARATUS FOR PROVIDING HOLDOVER POWER

BACKGROUND OF THE INVENTION

1. Field of the Invention

This invention relates to apparatus having power supply circuitry that employs an energy storage element to provide holdover power to a load. This invention further relates to power supply circuitry that employs a high-density low voltage energy storage device to provide holdover power to a load.

2. Statement of the Problem

In modern power system design for equipment such as computer servers or telecommunications network elements, a need exists for a certain amount of holdover energy storage on each field or replicable unit. This holdover energy storage is often referred to as "hold up capacitance" and permits the field or replicable unit to maintain normal operation even if there is a momentary interruption of its primary power source. Such interruptions are common when a fault in a particular unit causes its power fuse to blow. All other units connected to the same power source then experience a severe momentary voltage dip or transient. This can occur during rectifier switchovers, reconfiguration of universal power supplies, and power feeder reconfigurations. For high power units, the capacitance needed to store the required holdover energy can be large, physically big and expensive. A need therefore exists for apparatus that reduces the size and cost impact of the required holdover energy source while still providing the required holdover energy protection.

A capacitor is the simplest and least expensive apparatus for providing holdover power. The magnitude of the capacitance and the magnitude of the load to which the capacitor is connected define the duration of the holdover time. The holdover time provided by low-density capacitors of a readily obtainable capacitance and physical size is in the order of microseconds. Longer holdover times are obtainable when larger capacitors are used. However, the duration of the obtainable holdover times is often limited by the space available to house the larger capacitors, and their affordability.

It is known to use backup batteries to provide holdover power. But, batteries can be expensive and may require the use of banks of batteries having a capacity sufficient to power a load for minutes or hours when interruption of commercial power occurs. Power supplies having this holdover power capability are not economically feasible for many applications. The cost, weight, and size of such power supplies exceed the available space and cost of the circuitry to be protected.

Electronic circuitry of the type used in computer servers and communication equipment is often modular or space limited and has a need for protection against power transients in the order of milliseconds. To be economically feasible, the holdover power apparatus should be proximate to the load to be protected. Also, it should be small in size and not occupy an inordinate amount of space on the circuit board or module containing the load circuitry to be protected.

It is therefore a problem to equip electronic circuitry with holdover power protection that is economical in size and cost.

SUMMARY OF THE SOLUTION

The present invention solves the above and other problems by the provision of a method and apparatus that provides holdover power circuitry that is economical in size and cost and that may be the integrated with the load circuitry to be protected. In circuit board or circuit module applications, the circuitry embodying the present invention is sized so that it may be economically mounted on the circuit board or circuit module containing load circuitry. It will be understood by those skilled in the art that the terms "circuit board" and "circuit module" are synonymous and interchangeable insofar as the present invention is concerned. It is immaterial to the present invention whether it is embodied on a "circuit board" or a "circuit module" since the present invention may be embodied using any known mounting technology. The drawing figures and the detailed description refer to both "circuit boards" and "circuit modules".

A circuit board is a collection of components such as chips and discrete components soldered to a printed wiring board. A module can be a circuit board, but can also be a more general element, like a fan unit, power supply or optical assembly.

The holdover power apparatus embodying the present invention protects against voltage transients generated by load circuitry on a protected circuit module, as well as against voltage transients appearing on the power input to the protected circuit module. The holdover power apparatus of the present invention further protects against transients applied to the input of the protected circuit module by nearby circuit modules.

The holdover power apparatus of the present invention detects the beginning of transients and generates a boost voltage that is applied to the load circuitry of the protected circuit module. The boost voltage maintains a constant voltage on the load circuitry of the protected circuit module. The protection time provided by the holdover power apparatus of the present invention is sufficient to provide protection against short duration transients generated anywhere in the system in embodying the present invention.

In accordance with an embodiment of the invention, a plurality of circuit modules are provided each having a power input that receives an operating voltage (48 volts for example). Other voltages may be used if desired. The received operating voltage is applied to a power module comprising a voltage converter that reduces the received operating voltage to a lower voltage (12 volts for example). Other voltages may be used if desired. This lower voltage is applied to an intermediate bus, which is connected to a plurality of point of load (POL) voltage converters. Each POL voltage converter receives the lower voltage on the intermediate bus and outputs a reduced voltage that is applied to semiconductor chips and other devices comprising the load circuitry to be protected. Each POL voltage converter may supply the same or a different voltage to a different group of circuit elements defining a load. The number of POL voltage converters on a circuit module depends upon the number of different voltages and current levels required by the circuit elements on the circuit module.

The input to a circuit module is also connected to a power supervisor which monitors the received operating voltage to detect the beginning of transients on the input. Upon the detection of a transient, the power supervisor activates a boost converter to maintain a constant voltage on the intermediate bus and, in turn, on input of the POL voltage converters.

An input of the boost converter is connected to an energy storage element such as a conventional capacitor, an ultra capacitor, or a circuit module mounted rechargeable battery such of the AAA or D size. The energy storage element is maintained in a charged stage by a trickle charger connected to the input of the circuit module.

The energy storage element is sized to have the energy required to power the boost converter to maintain a constant voltage on the intermediate bus for time duration greater than that of normally expected transients. The boost converter is controlled by the power supervisor, which maintains the boost converter in an off state during transient free conditions. Upon the detection of a low voltage transient, the power supervisor switches the boost converter to an on state in which the energy storage element supplies power to the boost converter to apply a boost voltage to the intermediate bus for the duration of normally encountered transients. This boost voltage counteracts the effect of the transient on the intermediate bus by maintaining a constant voltage on the intermediate bus.

The energy storage element may comprise a low-density energy storage element, such as a conventional capacitor, for applications in which the required holdover time is in the order of microseconds. When greater holdover times are desired, the energy storage element may be a high-density, low voltage energy storage element such as an ultra capacitor or a small primary or rechargeable battery. High-density, low voltage energy storage elements provide holdover power for time durations is in the millisecond range.

The embodiment described above is adapted to provide holdover power for transients detected on the power input to a circuit module. Such transients can propagate though the power module and destabilize the voltage on its intermediate bus. The present invention is also adapted to provide holdover protection from transients generated by circuit malfunctions on other circuit modules.

Circuit malfunctions on another circuit module can cause other circuit modules to draw excessive current for a brief interval prior to the time the fuse or other overload protection device operates in the other circuit modules. Since the inputs of all circuit modules are connected to the same system supply bus, this brief excessive current in a malfunctioning circuit module can generate transients by a lowering of the operating voltage received by the input of all circuit modules. Such transients can disrupt normal functioning of circuitry of the other circuit modules. The holdover power apparatus of the present invention detects such transients and applies a boost voltage to the intermediate bus of a protected circuit module to maintain a substantially constant potential on the intermediate bus of the protected circuit module.

The invention may include other exemplary embodiments described below.

DESCRIPTION OF THE DRAWINGS

The same reference number represents the same element on all drawings.

DETAILED DESCRIPTION OF THE INVENTION

FIGS. 1-4 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
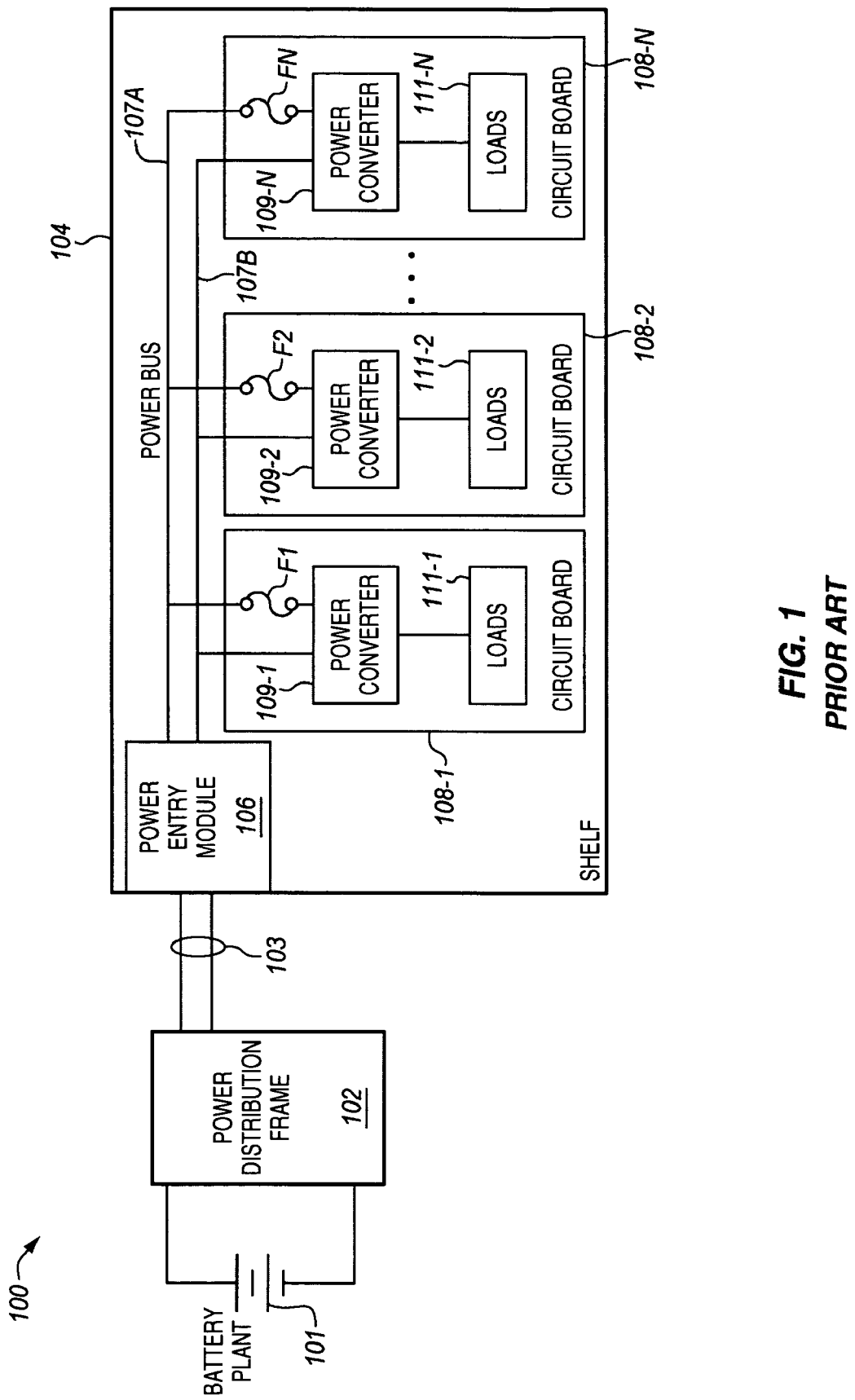
FIGS. 1, 2 and 3 disclose prior art power systems.

Description of FIG. 1

FIG. 1 discloses prior art apparatus that provides holdover power for telephone offices and the like. The FIG. 1 apparatus provides holdover power for an extended period of time such as minutes, hours or days. Battery plant 101 may be massive in size and is typically stored in a remote location such as a basement. The output of battery plant 101 extends to power distribution frame 102 which extends battery power over conductors 103 to power entry module 106 of shelf 104. Shelf 104 houses circuit boards 108-1 through 108-N. Circuit boards 108 are mounted in slots of shelf 104 in a manner well known in the art.

Power entry module 106 receives battery power over conductors 103 and extends the received battery power over conductors 107A and 107B to the input of power converters 109-1 through 109-N. Power converters 109 reduce the voltage received on their input to a lower voltage required by circuit loads 111-1 through 111-N. Fuses F1, F2 and FN protect their associated circuitry from damage caused by power overloads.

The circuitry of FIG. 1 is protected against transients such as lightning strikes and current surges by the massive energy inertia provided by a battery plant 101. The circuitry of FIG. 1 is protected against long-term power failure by the energy reserve of battery plant 101 as well as other facilities provided in the central office such as a reserve generating plant (not shown) that output emergency AC power to the entire central office including battery plant 101.

The apparatus of FIG. 1 is satisfactory for use in telephone central offices in the like. However, short duration transients can still propagate through the power infrastructure, so some localized storage is needed to prevent circuit malfunction.

Figure 2:
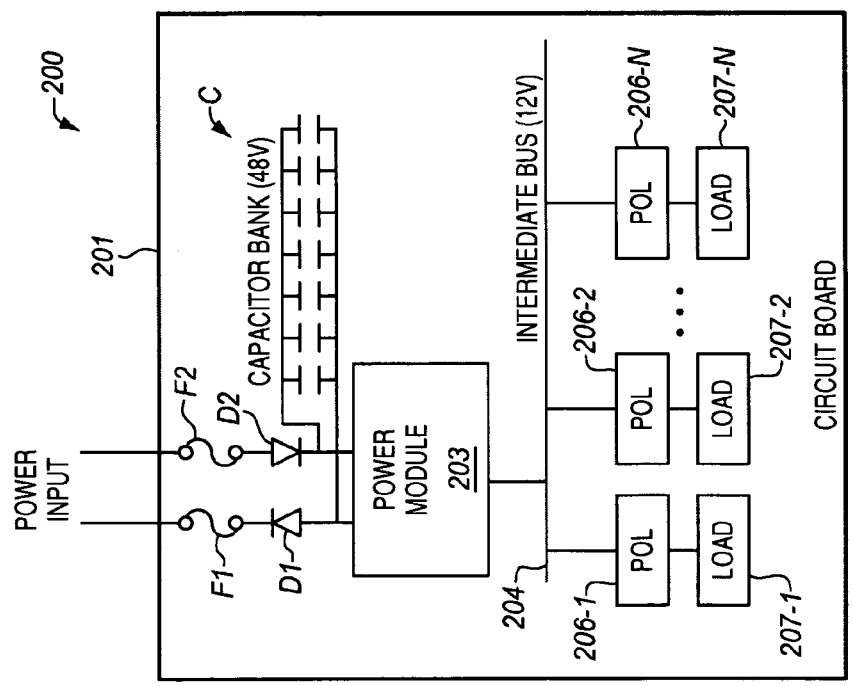

Description of FIG. 2

FIG. 2 discloses another prior art circuit that provides holdover energy backup. Circuit board 201 receives an input voltage that is extended through fuses F1 and F2 and diodes D1 and D2 to capacitor bank C. Capacitor bank C has sufficient reserve to provide holdover power for transients of a normally expected duration. The output of capacitor bank c is applied to power module 203 which reduces the received voltage to an intermediate level such as 12 volts. This intermediate voltage is applied to intermediate bus 204 and from there to the plurality of point of load POL voltage converters 206-1 through 206-N. The POL voltage converters 206 are modular switching power supplies that convert the received intermediate voltage to an output voltage having a magnitude required by loads 207-1 through 207-N.

The ability of the circuit of FIG. 2 to provide holdover power is limited by the power required by loads 207 and the capacity of capacitor bank C. A disadvantage of the circuit of FIG. 2 is that the size of the space required to accommodate capacitor bank C is unacceptable for use with electronic apparatus where volumetric density or weight are important considerations. The holdover time provided by the apparatus of FIG. 2 is in the order of microseconds when capacitors are used of a size that enables them to be accommodated in a reasonable fraction of the space available on circuit board 201.

Figure 3:
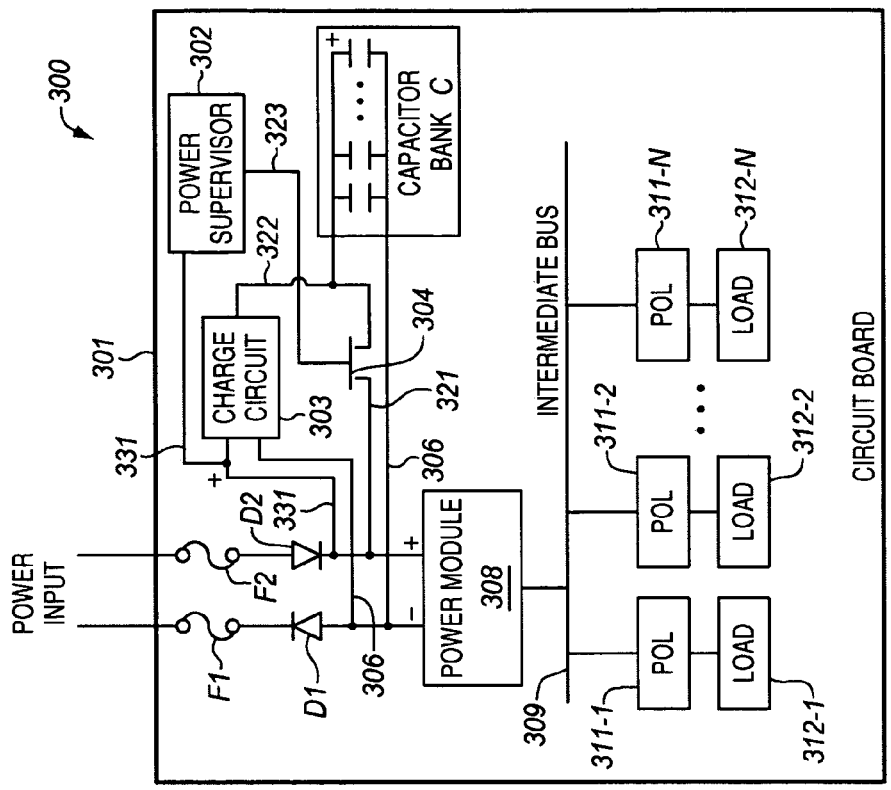

Description of FIG. 3

FIG. 3 discloses another prior art circuit that provides holdover power. The circuit of FIG. 3 is similar to that of FIG. 2 in that both have a power input, a pair of fuses, a pair of diodes, a power module, an intermediate bus, a plurality POL of voltage converters, and a plurality of loads. The above items of FIG. 3 are identical in function to their counterparts on FIG. 2. On FIG. 3, the fuses are designated F1 and F2, the diodes are designated D1 and D2, the power module is designated 308, the intermediate bus is designated 309, the POL voltage converters are designated 311-1 through 311-N and the loads are designated 312-1 through 312-N. The circuit board is designated 301. A further description of the above enumerated elements is not repeated herein since the function of these elements is identical to that of their priorly described counterparts on FIG. 2.

The circuit of FIG. 3 additionally has a power supervisor 302, a charge circuit 303 and a capacitor bank C. Capacitor bank C of FIG. 3 is connected by conductor 322 to the output of charge circuit 303. Charge circuit 303 is connected to input conductors 331 and 306 to maintain a trickle charge on capacitor banks C. Charge circuit 303 boosts the voltage it receives on paths 306 and 331 to a higher voltage, such as 72 volts, which is applied over path 322 to capacitor bank C. The power available from a given sized capacitor increases as the square of the voltage on the capacitor.

Power supervisor 302 monitors the input voltage applied to power module 308. Power supervisor 302 maintains switch 304 in an open state as long as the voltage on the power input conductor 331 remains free of transients. When a transient is received, the transient is extended over path 331 to the input of power supervisor 302. Power supervisor 302 responds to the receipt of the transient by extending a signal over conductor 323 to close the normally open contacts of switch 304. The closure of these switch contacts extends the 72 volt output of capacitor bank C over path 322 and through the closed contacts of switch 304 and over the path 321 to the + input of power module 308. This increases the input voltage to power module 308 and therefore increases the energy available on its output that is connected to intermediate bus 309. This maintains a constant potential on intermediate bus 309 and the inputs of the POL voltage converters for the duration of the received transient. This, in turn, maintains a constant potential to loads 312 sufficient to maintain their operation. Power supervisor 302 continues to monitor the received input voltage and at the end of a transient, opens the contacts of switch 304 via conductor 323. This disconnects the capacitor bank C from the + input of power module 308 and returns the operation of the circuit of FIG. 3 to a transient free state. Charge circuit 303 then slowly recharges the capacitor, readying it for the next transient.

The apparatus of FIG. 3 is an improvement over that of FIG. 2 in that its capacitor bank C is charged to a higher voltage. This is advantageous since the higher voltage of capacitor bank C of FIG. 3 provides an increased holdover time compared to that of the circuit of FIG. 2. The holdover time is increased exponentially by the increased voltage of the capacitor bank C of FIG. 3. This is in accordance with Joules Law, which states that stored energy is related to the size of a capacitor and the square of the charge voltage.

The circuit of FIG. 3 provides increased holdover time because of the increased charge on the capacitor bank. However, the holdover time is still in a microseconds range if normally available, low-density capacitors are used having sizes commensurate with those used in circuit board or module applications. High voltage capacitors work, but are expensive and large per Joule stored.

Figure 4:
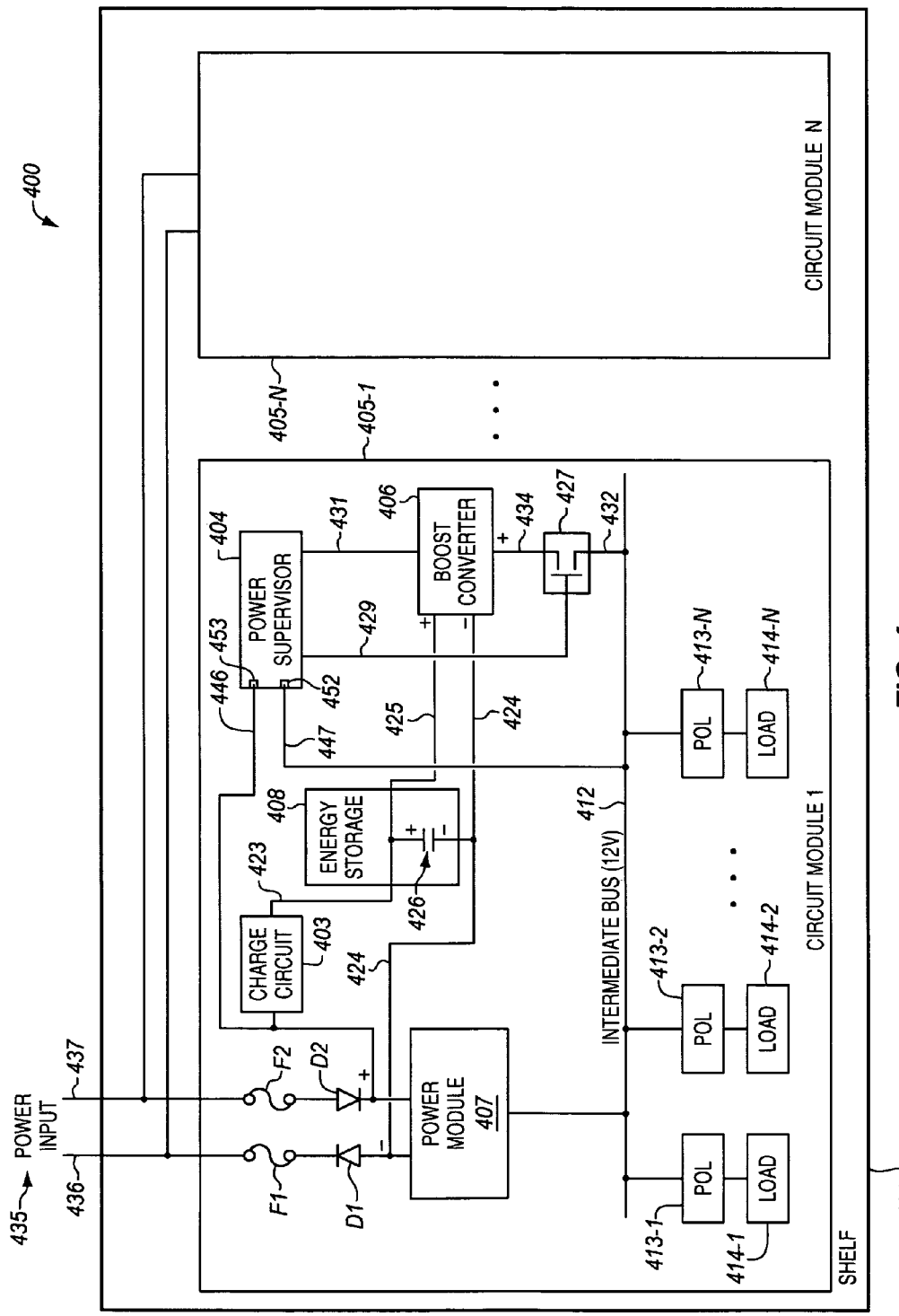
FIG. 4 discloses a possible embodiment of the invention.

Description of FIG. 4

FIG. 4 discloses a plurality of circuit modules 405-1 through 405-N that uses holdover power using energy storage elements whose physical size, cost and weight is more compatible with circuit module technology. Circuit module 405-1 is shown in detail on FIG. 4. The details of the remaining circuit modules, such as 405-N, are not shown since they are identical to the details of circuit module 405-1 in so far as the present invention is concerned.

Circuit module 405-1 provides improved holdover power for loads 414-1 through 414-N for the duration of transients received on conductors 436 and 437 of power input 435. Circuit module 405-1 provides this improved holdover power capability by the use of an energy storage element 426 whose physical size is compatible with circuit board or module technology. Energy storage element 408 may advantageously comprise a high-density, low-voltage energy source 426 such as an ultra-capacitor or a battery. Such elements provide holdover power times in the millisecond range.

Circuit module 405-1 is similar to that of FIG. 3 in that it has a power module 407, intermediate bus 412, a plurality of POL voltage converters 413-1 through 413-N and a plurality of loads 414-1 through 414-N. Circuit module 405-1 is similar to that of FIG. 3 in that it has conductors 436 and 437 of power input 435, fuses F1 and F2 and a pair of diodes D1 and D2 that apply input power to power module 407. No further description of the above-enumerated elements for FIG. 4 is needed since these elements function in the same manner as do their counterpart elements on FIG. 3.

Conductors 436 and 437 of power input 435 receive an operating voltage from a system power source (not shown). A typical input operating voltage may be 48 volts. However, the circuit of FIG. 4 may operate with other voltages. The received input operating voltage is extended over conductors 436 and 437, through fuses F1 and F2 and through diodes D1 and D2 to the input of power module 407. Power module 407 is a switching power supply that reduces the received operating voltage to an intermediate voltage that is applied to intermediate bus 412. This intermediate voltage may be 12 volts. However, the intermediate voltage may be of any level suitable for operation with electronic circuitry. Intermediate bus 412 extends the intermediate voltage to inputs of POL voltage converters 413-1 through 413-N. Each POL voltage converter 413 reduces the received intermediate voltage to a reduced voltage that is applied to the one of loads 414-1 through 414-N to which each POL voltage converter is connected.

Power supervisor 404 detects transients on input conductors 436 and 437 and operates boosts converter 406 to maintain a constant voltage on intermediate bus 412 for the duration of the transient. Power supervisor 404 controls the operation of switch 427 as well as the operation of boost converter 406. Conductor 446 extends the potential on the output of diode D2 to input 453 of power supervisor 404. This enables power supervisor 404 to monitor transients appearing on conductor 437. Conductor 429 of power supervisor 404 controls power switch 427, causing it to connect the output of boost converter 406 over conductors 434 and 432 to intermediate bus 412 whenever a power transient is detected.

Conductor 429 receives signals from power supervisor 404 to maintain the switch contacts 427 in an open state so long as transients are not applied to input conductor 437. Conductor 425 extends the output of energy storage element 426 to boost converter 406. This activates boosts converter 406 which applies a boost voltage to conductor 434. Upon the detection of a transient, power supervisor 404 extends a signal over conductor 429 to close the contacts of switch 427. This applies the boost voltage on conductor 434 trough switch contacts and via conductor 432 to intermediate bus 412 for the duration of the received transient. Conductor 431 interconnects boost converter 406 and power supervisor 404.

Circuit module 405-1 also detects transients on intermediate bus 412 and operates boosts converter 406 to maintain a constant voltage on intermediate bus 412. Conductor 447 extends from intermediate bus 412 to a second input 452 of power supervisor 404. This connection enables power supervisor 404 to detect a transient on intermediate bus 412 and operate switch 427 and boost converter 406 and the same manner as priorly described to maintain a constant voltage on intermediate bus 412 for the duration of a received transient.

As priorly mentioned, circuit module 405-1 is protected from transients applied to its input by malfunctioning circuitry of other circuit modules. Such transients are detected as above described. In response to the detection of such transients, the boost circuitry of the present invention is activated to maintain a substantially constant voltage on intermediate bus 412.

Energy storage element 408 is advantageously a high-density, low-voltage storage device that is maintained in a charged date by charge circuit 403. A typical voltage for energy storage device 408 is 3.5 volts. Other voltages may be used if desired.

The boost circuitry of circuit module 405-1 is effective to provide holdover power in the millisecond range when energy storage element 426 comprises an ultra capacitor or a battery of similar energy density.

Ultra capacitors are well-known devices in the art. An ultra capacitor is constructed using a metal foil bonded to an activated carbon mat. The activated carbon is separated by a glass paper and layered or rolled into a container. The properties of an ultra capacitor are dependent upon how porous the activated carbon mat is and how small the electrolyte ions are. Activated carbon electrodes used in ultra capacitors have a large surface area and small charge separation distances on the order of 10 Angstrom's or less. This combination of large surface area and small charge separation distance allows ultra capacitors to store large amounts of energy. Because the charging and discharging of an ultra capacitor is not a chemical process, ultra capacitors can be cycled almost indefinitely with no deterioration. Ultra capacitors have 10 times the energy density of conventional electrolytic capacitors and 10 times the power density of battery storage systems. Power density is the ratio of power delivery capability to the weight of the device. Advantageously, the high power density of ultra capacitors permits them to store adequate holdup energy for a module consuming several hundred watts, while still having small size, weight, and cost properties.

The above description discloses a possible exemplary embodiment of this invention. It is expected that those skilled in the art can and will design alternative embodiments that infringe on this invention as set forth in the claims below literally or through the Doctrine of Equivalents. As priorly described, the apparatus of the present invention may be embodied using any mounting technology and is not limited to circuit boards or circuit modules. Also, each circuit module may serve one or more loads. Some circuit modules may not require holdover power protection. It will be understood by those skilled in the art that a circuit module is any element or combination of elements adapted to serve as a mounting for electrical components.

I claim:

1. Apparatus defining a circuit module having an energy source adapted to provide holdover power to a load, said circuit module comprising:
    an input that receives an input voltage;
    an intermediate bus;
    a power module that receives said input voltage and applies an intermediate voltage of a lower magnitude to said intermediate bus,
    an energy storage element;
    a boost converter coupled to said energy storage element;
    a power supervisor adapted to monitor said input voltage; and
    said power supervisor is responsive to the detection of a transient on said input voltage and/or said intermediate bus voltage to cause said energy element and said boost converter to close a normally open switch;
    said closure of said switch applies a boost voltage from said boost converter to said intermediate bus to maintain a substantially constant voltage on said intermediate bus for the duration of said transient.

2. The circuit module of claim 1 characterized in that said energy storage element is selected from a group consisting of:
    a low capacitor, a low voltage, high-density ultra capacitor and a battery.

3. The circuit module of claim 1 further including said normally open switch whose conductive state is controlled by said power supervisor;
    said boost converter receives a charge voltage from said energy storage element to generate said boost voltage;
    said power supervisor is responsive to said detection of said transient to close normally open contacts of said switch;
    the closed state of said contacts connects said boost converter to said intermediate bus to maintain said constant voltage on said intermediate bus.

4. The circuit module of claim 1 further including a charge circuit for maintaining said energy storage element in a charged state.

5. The circuit module of claim 1 characterized in that said energy storage element has a voltage lower than both said input voltage and the boost voltage of said intermediate bus.

6. The circuit module of claim 1 characterized in that said intermediate bus is connected to at least one POL voltage converts said intermediate voltage to a voltage required by at least one load circuit to which said at least one POL voltage converter is connected.

7. The circuit module of claim 1 characterized in that said input of said circuit module is connected to an input on other circuit modules;
    an increased current load in any one of said other circuit modules applies a transient to said input voltage on said circuit module; and
    said power supervisor detects said transient from said other circuit to operate said energy source and said boost converter to maintain said constant voltage on said intermediate bus of said circuit module.

8. The circuit module of claim 1 characterized in that said received input voltage may be approximately 48 volts; said intermediate voltage may be approximately 12 volts; and said charge voltage of said energy storage element may be approximately 3.5 volts.

9. A method of operating the circuit module of claim 1 comprising the steps of: receiving said input voltage on said input;
    applying said input voltage to said power module;
    applying an intermediate voltage of a lower magnitude from said power module to said intermediated bus; and
    operating said power supervisor in response to the detection of a transient on said input voltage to control said energy storage element and said boost converter to generate said boost voltage that operates normally open switch contacts to maintain said substantially constant voltage on said intermediate bus for the duration of said transient.

10. Apparatus defining a circuit module having an energy source adapted to provide holdover power to a load, said circuit module comprising:
    an input that receives an input voltage;
    an intermediate bus coupled to a load;

a power module that receives said input voltage and applies to said intermediate bus an intermediate voltage of a lower magnitude than said input voltage;

an energy storage element;

a boost converter that receives a charge voltage from said energy storage element; said boost converter is responsive to the reception of said charge voltage to apply a boost voltage to on an output of said boost converter;

a power supervisor adapted to monitor said input voltage as well as said intermediate bus voltage;

said power supervisor is responsive to the detection of a transient on said input voltage and/or said intermediate bus voltage to close a normally open switch that establishes a connection between said intermediate bus and said output of said boost converter;

the establishment of said connection applies said boost voltage from a said boost converter to said intermediate bus to maintain a substantially constant voltage on said intermediate bus for the duration of said transient.

11. A method of operating apparatus defining a circuit module having an energy source adapted to provide holdover power to a load, said circuit module comprising:

an input, an intermediate bus, a power module, an energy storage element, a boost converter, and a power supervisor, said method comprising the steps of:

applying an input voltage to said input;

operating said power module to receive said input voltage and apply a voltage of a lower magnitude to said intermediate bus, coupling said energy storage element to said input;

coupling said boost converter to said energy storage element to receive a charge voltage;

operating said power supervisor to monitor said input voltage;

operating said energy storage element and said boost converter to generate a boost voltage; and operating said power supervisor in response to the detection of a transient on said input to close a switch to connect said boost converter to said intermediate bus;

said connection is effective to maintain a substantially constant voltage on said intermediate bus for the duration of said transient.

12. The method of claim 11 wherein said energy storage element is selected from a group consisting of:

a low-density capacitor, a low voltage high-density ultra capacitor and a battery.

13. The method of claim 11 further including the step of: operating a charge circuit for maintaining said energy storage element in a charged state.

14. The method of claim 11 further including the step of:

operating said boost converter to receive said charge voltage from said energy storage element to generate said boost voltage that is applied to said intermediate bus.

15. The method of claim 11 further including the steps of: applying the voltage on said intermediate bus to at least one POL voltage converter; and operating said at least one POL voltage converter to convert said intermediate voltage to a voltage required by load circuits to which said least one POL voltage converter is connected.

16. The method of claim 11 further including the steps of:

connecting said input of said circuit module to an input on other circuit modules;

an increased current load in any one of said other circuit modules applies a transient to said input voltage on said circuit module; and operating said power supervisor to detect said transient from any one of said other circuit modules to operate said energy storage element and said boost converter to maintain said constant voltage on said intermediate bus of said circuit module.

* * * * *

UNITED STATES PATENT AND TRADEMARK OFFICE
CERTIFICATE OF CORRECTION

| | |
|---|---|
| PATENT NO. | : 7,423,852 B2 |
| APPLICATION NO. | : 11/137524 |
| DATED | : September 9, 2008 |
| INVENTOR(S) | : Charles C. Byers |

Page 1 of 1

It is certified that error appears in the above-identified patent and that said Letters Patent is hereby corrected as shown below:

At column 8, line 11, the texts "a low capacitor" should read --a low-density capacitor--.

At column 9, line 9, the texts "saidinput" should read --said input--.

At column 9, line 12, the texts "and/or said intermediate" should read --and/or on said intermediate--.

Signed and Sealed this

Sixteenth Day of December, 2008

JON W. DUDAS
*Director of the United States Patent and Trademark Office*